United States Patent
Lee et al.

(10) Patent No.: US 8,499,055 B2
(45) Date of Patent: Jul. 30, 2013

(54) FILE DECODING SYSTEM AND METHOD

(75) Inventors: Chung-I Lee, Taipei Hsien (TW);
Chien-Fa Yeh, Taipei Hsien (TW);
Cheng-Feng Tsai, Taipei Hsien (TW);
Shan-Chuan Jeng, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 400 days.

(21) Appl. No.: 12/875,140

(22) Filed: Sep. 3, 2010

(65) Prior Publication Data
US 2011/0270941 A1 Nov. 3, 2011

(30) Foreign Application Priority Data
Apr. 29, 2010 (TW) ................................ 99113728 A

(51) Int. Cl.
*G06F 15/167* (2006.01)
*G06F 15/173* (2006.01)

(52) U.S. Cl.
USPC ............................. 709/208; 709/226; 709/247

(58) Field of Classification Search
None
See application file for complete search history.

(56) References Cited

U.S. PATENT DOCUMENTS

| | | | |
|---|---|---|---|
| 6,304,904 B1* | 10/2001 | Sathyanarayan et al. | 709/224 |
| 6,345,303 B1* | 2/2002 | Knauerhase et al. | 709/238 |
| 6,385,638 B1* | 5/2002 | Baker-Harvey | 718/107 |
| 6,785,784 B1* | 8/2004 | Jing et al. | 711/154 |
| 7,634,560 B2* | 12/2009 | Haga et al. | 709/224 |
| 7,996,525 B2* | 8/2011 | Stienhans et al. | 709/224 |
| 2002/0056010 A1* | 5/2002 | Lincoln et al. | 709/247 |
| 2005/0005025 A1* | 1/2005 | Harville et al. | 709/241 |
| 2009/0012963 A1* | 1/2009 | Johnson et al. | 707/10 |
| 2010/0011370 A1* | 1/2010 | Kubo et al. | 718/104 |
| 2010/0333094 A1* | 12/2010 | Restall et al. | 718/102 |

* cited by examiner

*Primary Examiner* — Patrice Winder
(74) *Attorney, Agent, or Firm* — Altis Law Group, Inc.

(57) ABSTRACT

A file decoding method uses a master server to decode multimedia files. The method records statuses of a plurality of slave servers in a status table, receives a decoding request to decode the multimedia file from a web server, and selects one slave server from the status table to process the decoding request by the master server. The method further sends an Internet protocol (IP) address of the selected slave server to a web browser by the web server, sends a decoding command to the selected slave server by the web browser, decodes the multimedia file by the selected slave server, and transmits decoded data of the multimedia file to the web browser.

19 Claims, 6 Drawing Sheets

| Slave server name | CPU usage | GPU usage | Memory usage | Network load | Thread number | IP address | Status tag |
|---|---|---|---|---|---|---|---|
| Slave 1 | 60% | 50% | 55% | 10% | 60 | 10.163.8.2 | 1 |
| Slave 2 | 80% | 60% | 75% | 20% | 65 | 10.183.8.6 | 1 |
| Slave 3 | 60% | 40% | 50% | 8% | 80 | 16.163.4.2 | 1 |
| Slave 4 | 85% | 60% | 80% | 15% | 76 | 10.123.6.2 | 1 |
| Slave 5 | 90% | 80% | 85% | 30% | 82 | 12.153.9.2 | 1 |
| ... | | | | | | | |

| Slave server name | CPU usage | GPU usage | Memory usage | Network load | Thread number | IP address | Status tag |
|---|---|---|---|---|---|---|---|
| Slave 1 | 60% | 50% | 55% | 10% | 60 | 10.163.8.2 | 1 |
| Slave 2 | 80% | 60% | 75% | 20% | 65 | 10.183.8.6 | 1 |
| Slave 3 | 62% | 45% | 54% | 10% | 81 | 16.163.4.2 | 1 |
| Slave 4 | 85% | 60% | 80% | 15% | 76 | 10.123.6.2 | 1 |
| Slave 5 | 90% | 80% | 85% | 30% | 82 | 12.153.9.2 | 1 |
| ... | | | | | | | |

FIG. 4

| Slave server name | CPU usage | GPU usage | Memory usage | Network load | Thread number | IP address | Status tag |
|---|---|---|---|---|---|---|---|
| Slave 1 | 60% | 50% | 55% | 10% | 60 | 10.163.8.2 | 0 |
| Slave 2 | 80% | 60% | 75% | 20% | 65 | 10.183.8.6 | 0 |
| Slave 3 | 60% | 40% | 50% | 8% | 80 | 16.163.4.2 | 0 |
| Slave 4 | 85% | 60% | 80% | 15% | 76 | 10.123.6.2 | 0 |
| Slave 5 | 90% | 80% | 85% | 30% | 82 | 12.153.9.2 | 0 |
| ... | | | | | | | |

FIG. 5

FILE DECODING SYSTEM AND METHOD

BACKGROUND

1. Technical Field

Embodiments of the present disclosure relate to data decoding technology, and particularly to a file decoding system and method using a master server.

2. Description of Related Art

Currently, a web browser (e.g., HTML 5.0) has been used as a population of a cloud computing by an Internet service provider (ISP). A plurality of decoders must be embedded in the web browser to decode different kinds of multimedia files, such as an avi file, an swf file, or a vox file. However, the web browser is more complicated because too many decoders need to be embedded in the web browser to support all kinds of multimedia files.

BRIEF DESCRIPTION OF THE DRAWINGS

FIGS. 3-5 are examples of a status table of a plurality of slave servers.

DETAILED DESCRIPTION

All of the processes described below may be embodied in, and fully automated by, functional code modules executed by one or more general purpose computers or processors. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, or a tape drive.

Figure 1:
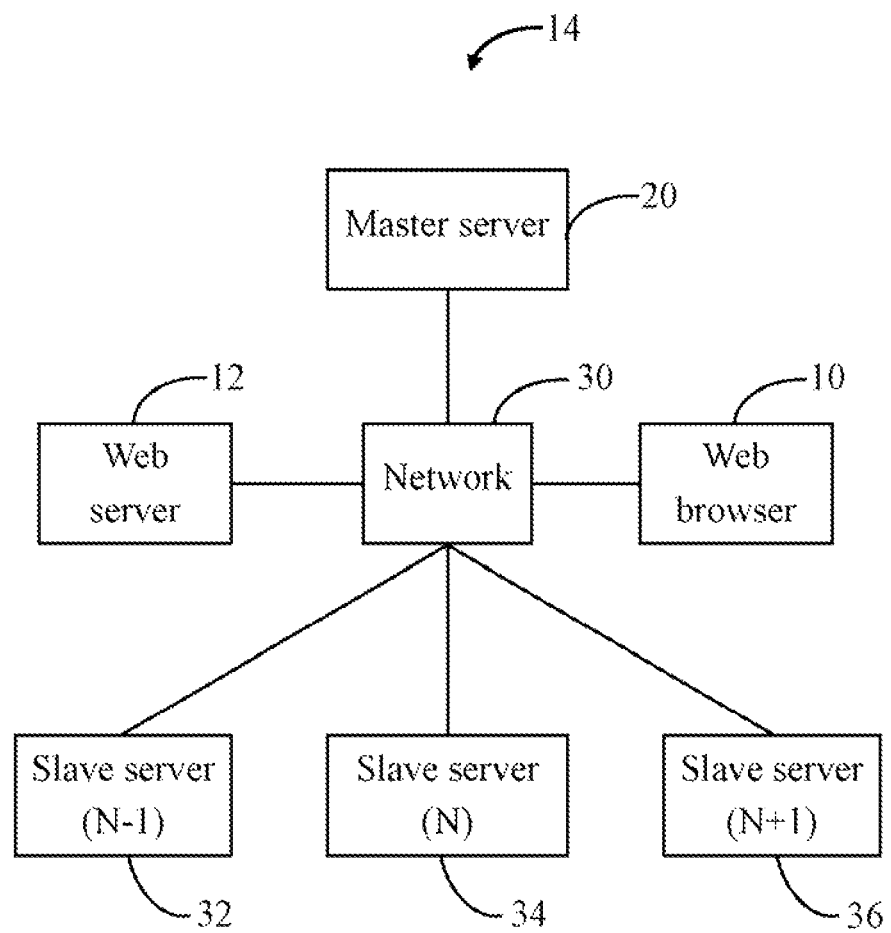
FIG. 1 is a schematic diagram of some embodiments of a file decoding system.

FIG. 1 is a schematic diagram of some embodiments of a file decoding system 14. In some embodiments, the file decoding system 14 may include a web browser 10, a web server 12, a master server 20, a network 30, and a plurality of slave server (e.g., 32, 34, and 36). In some embodiments, the master server 20 may be used to receive a decoding request of multimedia files from the web server 12, and to select a slave server to process the decoding request. The network 30 may be an intranet, the Internet or other suitable communication networks.

In some embodiments, each of the slave servers includes a plurality of decoders to decode different file formats of multimedia files. The web browser 10 is installed in a client computer. The web browser 10 provides an user interface to access the web server 12, and sends decoding requests of the multimedia files to the web server 12.

Figure 2:
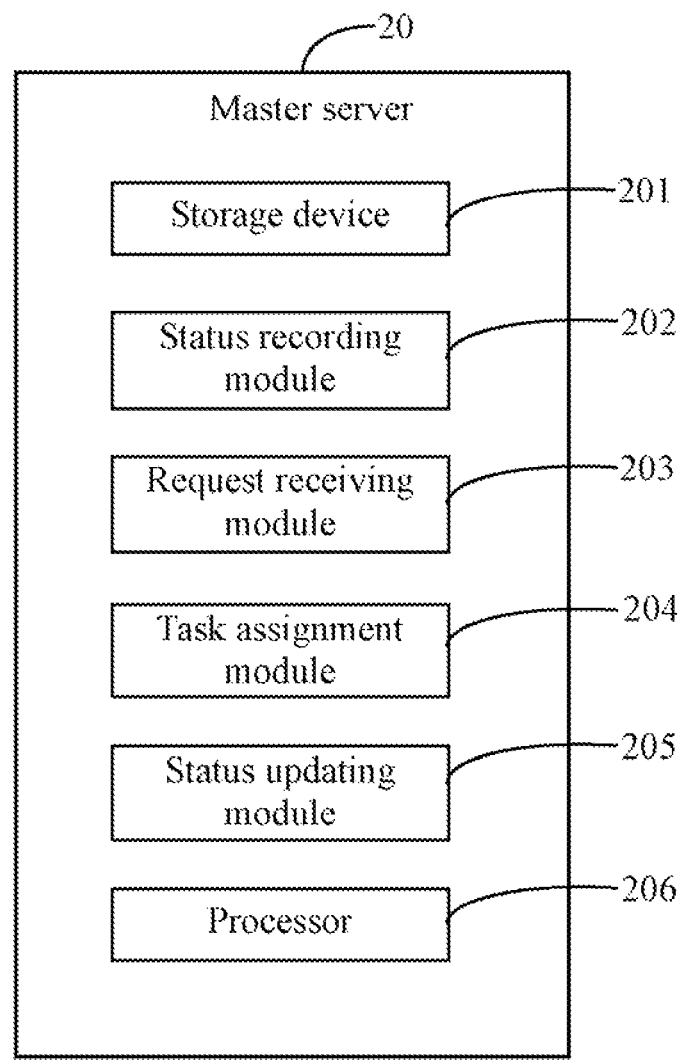
FIG. 2 is a block diagram of some embodiments of a master server in FIG. 1.

FIG. 2 is a block diagram of some embodiments of the master server 20. In some embodiments, the master server includes a storage device 201, a status recording module 202, a request receiving module 203, a task assignment module 204, a status updating module 205, and a processor 206. In some embodiments, the modules 202-205 comprise one or more computerized instructions that are stored in the storage device 201. The computerized code includes instructions that are executed by the at least one processor 206 to provide functions for modules 202-205.

Figure 3:
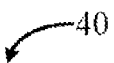

The status recording module 202 records a status for slave servers in a status table 40 (as shown in FIG. 3) upon the condition that the slave server connects to the master server 20. The status table 40 is stored in the storage device 201. For example, as shown in FIG. 3, the status table 40 may include a slave server name, a central processing unit (CPU) usage, a graphic processing unit (GPU) usage, a memory usage, a network load, a thread number, an Internet protocol (IP) address, and a status tag. In some embodiments, the status tag may be used to record a connection status between each of the slave servers and the master server 20. For example, the status tag of the slave server is set with "1" upon the condition that the slave server is connected with the master server 20. The status tag of the slave server is set with "0" upon the condition that the slave server is disconnected with the master server 20.

The request receiving module 203 receives the decoding request to decode the multimedia file from the web server 12. In some embodiments, the web server 12 receives the decoding request from the web browser 10. For example, the decoding request includes a file name, a file format, and a file path of the multimedia file stored in the storage device 201 of the master server 20.

The task assignment module 204 selects one slave server from the status table 40, and assigns a decoding task to the selected slave server to process the decoding request. Specifically, the task assignment module 204 first calculates a network utilization rate of each of the slave servers in the status table 40 according to the status of each of the slave servers. The task assignment module 204 selects the slave server with the minimum network utilization rate to process the decoding request.

For example, "$k_0$" represents a current CPU usage of a slave server, "$k_1$" represents a current GPU usage of the slave server, "$k_2$" represents a current memory usage of the slave server, "$k_3$" represents a current network load of the slave server, and "$k_4$" represents a current thread number of the slave server. Supposing weighting coefficients are X0, X1, X2, X3, and X4, where X0=$m_0$, X1=$m_1$, X2=$m_2$, X3=$m_3$, X4=$m_4$. Thus, if "Result" represents the network utilization rate of the slave server, then $$\text{Result} = \sum_{n=0}^{4} k_n m_n.$$

In some embodiments, X0+X1+X2+X3+X4=1. For example, X0=0.3, X1=0.35, X2=0.2, X3=0.1, and X4=0.05.

In other embodiments, if the slave server to process the decoding request is not selected within a preset time interval (e.g., 10 seconds), the status updating module 205 updates the status tag of each of the slave servers in the status table 40. For example, the status updating module 205 updates the status tag of each of the slave servers in the status table 40 from one to zero (refers to FIG. 5).

The status updating module 205 updates the status of the selected slave server in the status table 40 upon the condition that the selected slave server receives the assigned decoding task. For example, as shown in FIG. 3, slave 3 has the minimum network utilization rate in the status table 40. After updating the status table 40, as shown in FIG. 4, a new CPU usage of slave 3 is 62%, a new GPU usage of slave 3 is 45%, a new memory usage of slave 3 is 54%, a new network load of slave 3 is 10%, and a new thread number of slave 3 is 81.

The task assignment module 204 sends an Internet protocol (IP) address of the selected slave server to the web server 12.

Upon receiving the IP address of the selected slave server, the web browser 10 sends a decoding command to the selected slave server accordingly.

The selected slave server decodes the multimedia file, and transmits decoded data of the multimedia file to the web browser 10. Specifically, the selected slave server first obtains the multimedia file from the storage device 201 of the master server 20 according to the file name and the file path of the multimedia file. The selected slave server then obtains a decoder corresponding to the file format of multimedia file, and decodes the multimedia file using the obtained decoder. Upon accomplishing the decoding task, the selected slave server transmits the decoded data of the multimedia file to the web browser 10.

Figure 6:
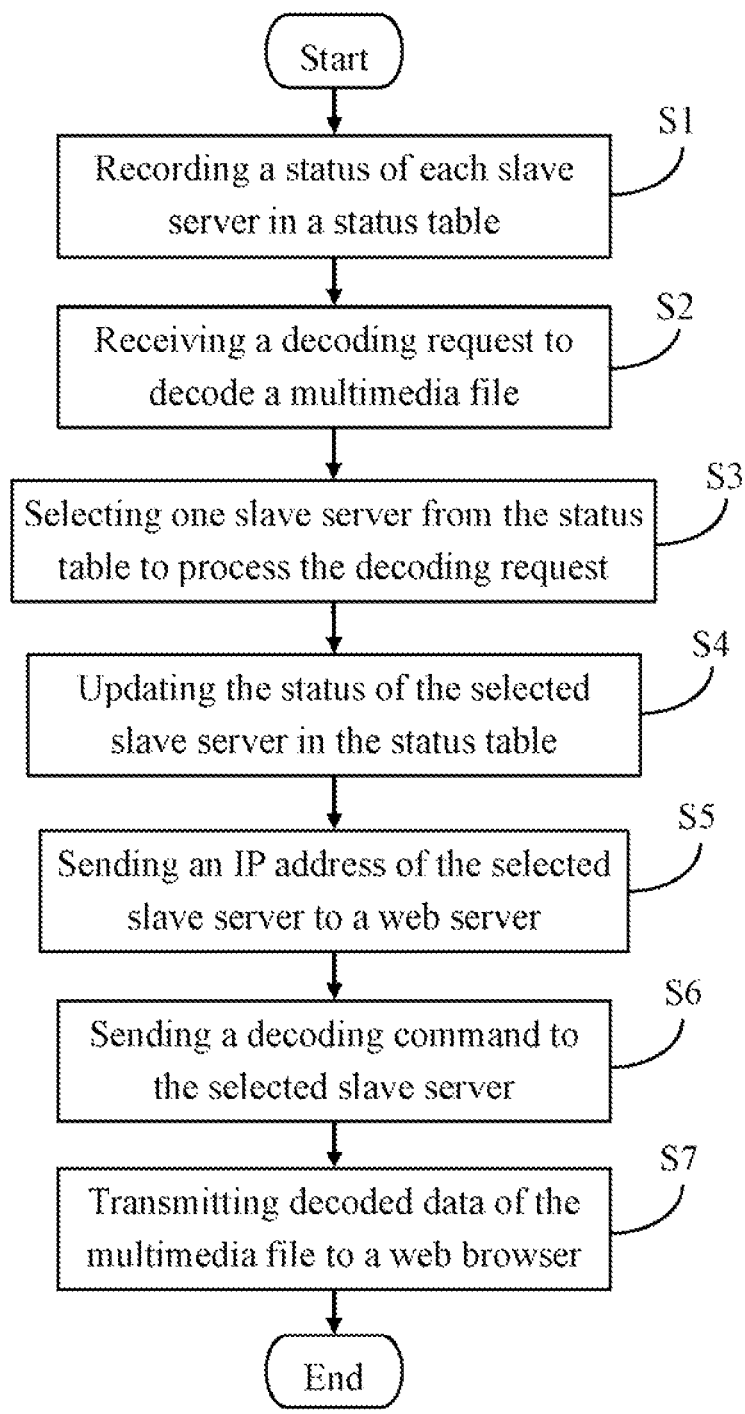
FIG. 6 is a flowchart of some embodiments of a file decoding method using the master server in FIG. 2.

FIG. 6 is a flowchart of some embodiments of a file decoding method. Depending on the embodiment, additional blocks may be added, others removed, and the ordering of the blocks may be changed.

In block S1, the status recording module 202 records a status for slave servers in a status table 40 (as shown in FIG. 3) upon the condition that the slave server connects to the master server 20. The status table 40 is stored in the storage device 201.

In block S2, the request receiving module 203 receives a decoding request to decode the multimedia file from the web server 12. In some embodiments, the web server 12 receives the decoding request from the web browser 10. For example, the decoding request includes a file name, a file format, and a file path of the multimedia file stored in the storage device 201 of the master server 20.

In block S3, the task assignment module 204 selects one slave server from the status table 40, and assigns a decoding task to the selected slave server to process the decoding request.

In block S4, the status updating module 205 updates the status of the selected slave server in the status table 40 upon the condition that the selected slave server receives the assigned decoding task.

In block S5, the task assignment module 204 sends an Internet protocol (IP) address of the selected slave server to the web server 12. The web server 12 sends the IP address of the selected slave server to the web browser 10.

In block S6, the web browser 10 sends a decoding command to the selected slave server according to the IP address of the selected slave server.

In block S7, the selected slave server decodes the multimedia file, and transmits decoded data of the multimedia file to the web browser 10. Specifically, the selected slave server first obtains the multimedia file from the storage device 201 of the master server 20 according to the file name and the file path of the multimedia file. The selected slave server then obtains a decoder corresponding to the file format of multimedia file, and decodes the multimedia file using the obtained decoder. Upon accomplishing the decoding task, the selected slave server transmits the decoded data of the multimedia file to the web browser 10.

In block S3, if the slave server to process the decoding request is not selected within a preset time interval (e.g., 10 seconds), the status updating module 205 updates the status tag of each of the slave servers in the status table 40. For example, the status updating module 205 updates the status tag of each of the slave servers in the status table 40 from one to zero (refers to FIG. 5).

In other embodiments, the master server 20 may receive other requests (e.g., an encoding request) from the web server 12, and select a pre-installed program from a slave server to process the corresponding request.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A master server, the master server in communication with a plurality of slave servers, the master server comprising:
a storage device operable to store multimedia files and a status table storing a status for each of the plurality of slave servers;
a request receiving module operable to receive a decoding request to decode the multimedia file from a web server;
a task assignment module operable to calculate a network utilization rate of each of the plurality of slave servers in the status table according to a formula of k0×m0+k1×m1+k2×m2+k3×m3+k4×m4, select one slave server with the minimum network utilization rate, and assign a decoding task to the selected slave server to process the decoding request, "k0" representing a current central processing unit (CPU) usage of a slave server, "k1" representing a current graphic processing unit (GPU) usage of the slave server, "k2" representing a current memory usage of the slave server, "k3" representing a current network load of the slave server, "k4" representing a current thread number of the slave server, and "m0", "m1", "m2", "m3", and "m4" representing weighting coefficients; and
a status updating module operable to update the status of the selected slave server in the status table upon the condition that the selected slave server receives the assigned decoding task.

2. The master server according to claim 1, wherein the decoding request comprises a file name, a file format, and a file path of the multimedia file.

3. The master server according to claim 1, wherein the master server further comprises a status recording module operable to record the status of the slave server in the status table upon the condition that the slave server connects to the master server.

4. The master server according to claim 1, wherein the task assignment module further operable to send an Internet protocol (IP) address of the selected slave server to the web server.

5. The master server according to claim 1, wherein the status table comprises a slave server name, a CPU usage, a GPU usage, a memory usage, a network load, a thread number, an IP address, and a status tag.

6. The master server according to claim 5, wherein the status tag records a connection status between each of the slave servers and the master server, the status tag of the slave server being set with a first preset value upon the condition that the slave server is connected with the master serve, and the status tag of the slave server being set with a second preset value upon the condition that the slave server is disconnected from the master server.

7. The master server according to claim 1, wherein a sum of the weighting coefficients of "m0", "m1", "m2", "m3", and "m4" is equal to one.

8. A file decoding method for decoding multimedia files using a master server, the master server in communication with a plurality of slave servers, the method comprising:

provided a storage device to store the multimedia files and a status table storing a status for each of the plurality of slave servers;

receiving a decoding request to decode the multimedia file from a web server;

calculating a network utilization rate of each of the plurality of slave servers in the status table according to a formula of $k0 \times m0 + k1 \times m1 + k2 \times m2 + k3 \times m3 + k4 \times m4$, selecting one slave server with the minimum network utilization rate, and assigning a decoding task to the selected slave server to process the decoding request by the master server, "k0" representing a current central processing unit (CPU) usage of a slave server, "k1" representing a current graphic processing unit (GPU) usage of the slave server, "k2" representing a current memory usage of the slave server, "k3" representing a current network load of the slave server, "k4" representing a current thread number of the slave server, and "m0", "m1", "m2", "m3", and "m4" representing weighting coefficients; and updating the status of the selected slave server in the status table by the master server upon the condition that the selected slave server receives the assigned decoding task.

9. The method according to claim 8, further comprising:

updating the status tag of each of the plurality of slave servers in the status table upon the condition that the slave server to process the decoding request is not selected within a preset time interval.

10. The method according to claim 8, wherein the decoding request comprises a file name, a file format, and a file path of the multimedia file.

11. The method according to claim 10, further comprising:

sending an Internet protocol (IP) address of the selected slave server to a web browser;

sending a decoding command to the selected slave server by the web browser according to the IP address of the selected slave server; and decoding the multimedia file by the selected slave server, and transmitting decoded data of the multimedia file to the web browser.

12. The method according to claim 11, wherein the step of decoding the multimedia file by the selected slave server, and transmitting decoded data of the multimedia file to the web browser comprises:

obtaining the multimedia file from the storage device of the master server according to the file name and the file path of the multimedia file; and obtaining a decoder corresponding to the file format of multimedia file, decoding the multimedia file using the obtained decoder, and transmitting decoded data of the multimedia file to the web browser.

13. The method according to claim 8, further comprising:

recording the status of the slave server in the status table by the master server upon the condition that the slave server connects to the master server.

14. The method according to claim 8, wherein the status table comprises a slave server name, a CPU usage, a GPU usage, a memory usage, a network load, a thread number, an IP address, and a status tag.

15. A non-transitory storage medium having stored thereon instructions that, when executed by a processor of a master server, causes the processor to perform a file decoding method for decoding multimedia files, the method comprising:

providing a storage device to store the multimedia files and a status table storing a status for each of slave servers connected with the master server;

receiving a decoding request to decode the multimedia file from a web server;

calculating a network utilization rate of each of the plurality of slave servers in the status table according to a formula of $k0 \times m0 + k1 \times m1 + k2 \times m2 + k3 \times m3 + k4 \times m4$, selecting one slave server with the minimum network utilization rate, and assigning a decoding task to the selected slave server to process the decoding request, "k0" representing a current central processing unit (CPU) usage of a slave server, "k1" representing a current graphic processing unit (GPU) usage of the slave server, "k2" representing a current memory usage of the slave server, "k3" representing a current network load of the slave server, "k4" representing a current thread number of the slave server, and "m0", "m1", "m2", "m3", and "m4" representing weighting coefficients; and updating the status of the selected slave server in the status table upon the condition that the selected slave server receives the assigned decoding task.

16. The non-transitory storage medium according to claim 15, wherein the decoding request comprises a file name, a file format, and a file path of the multimedia file.

17. The non-transitory storage medium according to claim 16, wherein the method further comprises:

sending an Internet protocol (IP) address of the selected slave server to a web browser;

sending a decoding command to the selected slave server by the web browser according to the IP address of the selected slave server; and decoding the multimedia file by the selected slave server, and transmitting decoded data of the multimedia file to the web browser.

18. The non-transitory storage medium according to claim 17, wherein the step of decoding the multimedia file by the selected slave server, and transmitting decoded data of the multimedia file to the web browser comprises:

obtaining the multimedia file from the storage device of the master server according to the file name and the file path of the multimedia file; and obtaining a decoder corresponding to the file format of multimedia file, decoding the multimedia file using the obtained decoder, and transmitting decoded data of the multimedia file to the web browser.

19. The non-transitory storage medium according to claim 15, wherein the method further comprises:

recording the status of the slave server in the status table by the master server upon the condition that the slave server connects to the master server.

* * * * *